United States Patent Office 3,429,637
Patented Feb. 25, 1969

3,429,637
NON-RECIPROCAL OPTICAL DEVICE
John L. Wentz, Randallstown, Md., assignor to Westinghouse Electric Corporation, Pittsburgh, Pa., a corporation of Pennsylvania
Filed Nov. 4, 1965, Ser. No. 506,352
U.S. Cl. 350—160      5 Claims
Int. Cl. G02f 1/28, 1/36

This invention relates to improvements in apparatus for effecting non-reciprocal transmission of optical energy and more particularly to such apparatus using electro-optical devices not requiring a magnetic field.

Prior art techniques and apparatus rely upon the Faraday magneto-optical effect for obtaining phase and polarization change in optical systems for making optical duplexers and isolators. The disadvantages of such prior devices is obvious since the provision of magnetic fields must necessarily be accompanied by bulky auxiliary equipment.

In applicant's copending application Ser. No. 343,319 filed Feb. 7, 1964, for Electro-optical Light Modulation Means, there is described and claimed a novel and improved system for modulating light energy. That system is described as being particularly adapted to the modulation of the "Q" of the resonant cavity of a stimulated emission of radiation device although it is also useful anywhere that a light shutter or modulator may be desired. That system is reciprocal since it utilizes a DC static field to bias the optic axis of the crystals but the present invention utilizes certain aspects of that invention in coordination with a microwave electric field to bias the respective optic axis of the crystal, the microwave being substituted for the direct current field of the prior application to accomplish non-reciprocity in a novel manner hereinafter described.

A primary object of the invention is to provide a novel and improved non-reciprocal optical transmission system.

Another object is to provide a novel and improved non-reciprocal optical transmission system which does not require a device relying upon the Faraday magneto-optic effect.

A still further object is to provide a novel and improved non-reciprocal optical transmission system which does not require the provision of a magnetic field and which uses only electro-optic crystals, or their equivalent.

The invention itself, however both as to its organization and method of operation, as well as additional objects and advantages, will best be understood from the following description when read in connection with the accompanying drawing, in which.

Figure 1:
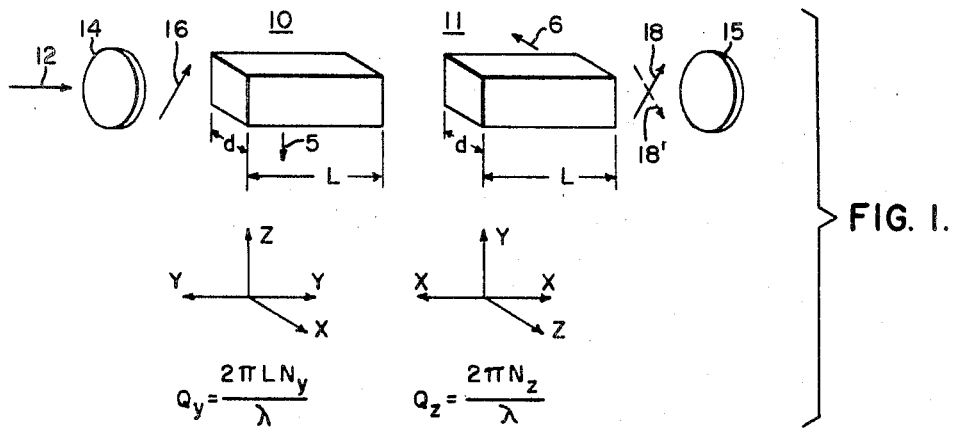
FIGURE 1 is a schematic illustration, simplified for clarity, of an electro-optical device utilizing a Pockels cell in accordance with the present invention.

Briefly, the present invention provides a controllable non-reciprocal optical transmission system in which a microwave electric field is utilized to bias a Pockels cell through which light is transmitted in a non-reciprocal manner. Two electro-optical crystals, preferably of the dihydrogen phosphate type such as potassium dihydrogen phosphate (KDP) are arranged in colinear relation on the axis of a microwave guide structure. A microwave transition is interposed between the two crystals to give a 90° rotation of the plane of polarization of the microwave field. The axes X, Y and Z for the particular crystal orientation in FIG. 1 are the axes of the index ellipsoid. The X-axis of one of the crystals and the Y-axis of the other crystals are arranged parallel to the light path. These crystals are of a particular orientation such that the electric fields, supplied by the microwave structure, are applied to the crystals transversely to the light path and along the respective Z-axis (optic axis) of the crystals. The crystals used have birefringent characteristics and have the property of retaining a constant index of refraction along their Z-axis when electric fields are applied along the Z-axis while possessing an electric-field-dependent index of refraction along their other two axes when the electric field is applied along the Z-axis.

Although birefringent crystals are well known in the art it is believed appropritae here, in order to facilitate an understanding of the invention, to review briefly their characteristics. The type of crystal used in accordance with this invention are uniaxial, that is, they have one axis, the optic axis, along which no phase retardation takes place between orthogonal components of the light polarization when the light passes parallel to this axis. The electro-optical effect in crystals is the result of the induced birefringence which occurs when an electric field is applied to the crystal along a particular axis in the crystal. Birefringence is a consequence of anisotrophy in the crystal indices or refraction. Birefringent crystals are best described in terms of the Fresnel ellipsoid which has axes proportional to the principal indices of refraction in the crystal. Plane polarized light incident upon a birefringent crystal will experience double refraction and phase retardation between the orthogonal components of the incident light. In uniaxial crystals, two of the indices of refraction in the ellipsoid are equal. Therefore, no birefringence occurs for light propagating perpendicular to the plane of the equal indices. This propagating direction determines the optic axis of the crystals. Crystals in which the three principal indices are unequal are biaxial, which results in the crystal having two optic axes. Electro-optic crystals, which are normally uniaxial become biaxial when an electric field is applied parallel to their optic axis. In this instance, the indices of refraction for light vibrating parallel to the X- and Y-axes may be altered when biasing voltages are applied to the Z- or optic axis. and the indices along the X and Y axes are no longer equal. This makes it possible to modulate or control the polarization of light passing through the crystals. When such light is passed through an analyzer the light will be modulated accordingly.

By proper dimensioning of the crystals and by applying appropriate electric biasing fields, depending upon the crystal dimensions, as hereinafter more fully explained, it is possible to produce a 90° phase change of both the components along the X and Y axis as linearly polarized light passes through the crystals.

The aforementioned copending patent application describes a novel arrangement wherein a DC biasing voltage is applied through terminals arranged on the respective crystals on an axis transverse to the optic axis. Also, there the transverse axis of the electrodes of the two crystals are arranged orthogonally with respect to each other, there being only air between the two crystals. The present invention utilizes the general arrangement of that invention but instead of using direct current biasing voltages on the crystals utilizes a traveling microwave field and a 90° phase transition between the two crystals to provide a non-reciprocal light transmission system. The direction of optical transmission is the same direction as the propagation of the traveling microwave electric field.

In order to facilitate the understanding of the present invention, the schematic illustration in FIGURE 1 leaves off the cooperating microwave structure, the orientation of the electric vectors of the traveling microwave being illustrated by arrows 5 and 6. The elongated parallelopiped electro-optical bar-shaped crystals 10 and 11 are arranged with Y-axis of crystal 10 and the X-axis of crystal 11 in coaxial alignment. Preferably, although not necessary, the elongated crystals 10 and 11 have a square cross-section. They may have a rectangular cross-section as long as the dimensions along their Z-axis are the same. The physical axis of each rod should lie in, or be perpendicular to, the 110 plane of the crystal and also be parallel to the X–Y crystal plane where, in this instance, the X and Y refer to the crystal axes. The system of the present invention is adapted to control the passage from a source of light represented by the light beam at 12 which is arranged to pass through a linear polarizing element 14 before entering the first crystal 10. In addition to other components the light modulating system includes an analyzer 15 with its polarization crossed to that of the polarization of the polarizing element 14. The plane of polarization of the light emerging from the polarizing device, which may be represented by the vector 16 is at 45° with respect to the X- and Z-axes of crystal 10 and 45° with respect to the Y- and Z-axes of crystal 11. Assuming the plane of polarization, as indicated by the vector 16, the following phase relationships are characteristic of the orthogonal components of polarized light propagating along the axis of the light beam and of the system. Let $N_x$, $N_y$ and $N_z$ be the principal indices of refraction for the X, Y and Z index ellipsoid axes, respectively, let L be the length of both of the crystals along the light path. Also let $d$ represent the dimension of the crystals transverse to the longitudinal axis. Since the crystals have a square cross section, the dimension $d$ will always be parallel to the Z axis of the respective crystals. Let $\lambda$ be the wave length of the incident radiation represented by the light beam 12. In entering the first crystal 10 from the left, the polarized light plane of which is represented by the vector 16, will be resolved into two orthogonal components, one vibrating parallel to the X-axis of crystal 10 and one vibrating parallel to the Y-axis of the crystal 11. With no modulating field applied along the Z-axis, the indices of refraction for components vibrating parallel to the X- and Y-axes are identical. Therefore, the orthogonal components do not experience any retardation with respect to each other and upon emerging from the crystal, recombine to form a plane polarized light beam with the same orientation indicated by vector 18 which is the same as the polarization of the incident light beam. When a modulating, transverse electric field is applied along the Z-axis, the X- and Y-indices of refraction will no longer be the same because of the internal stresses on the basic crystal structure brought about by the applied electric field. The orthogonal components of incident plane polarized light will now undergo a phase shift with respect to each other and upon emerging from the electro-optical crystal will recombine to form an elliptically polarized beam with the eccentricity dependent upon the amount of induced phase shift between the orthogonal components. For a particular magnitude of biasing field and length of crystal, the emerging components can have a phase difference of 180° and will recombine to form a plane polarized light beam with the plane of polarization at 90° to the input polarization.

Referring again specifically to FIGURE 1, in passing through the crystal 10, along the Y-axis of the crystal, the X component of the polarization undergoes a phase change of $$\phi_x = \frac{2\pi L}{\lambda} N_x \quad (1)$$

radians and the component parallel to the Z-axis undergoes a phase change of $$\phi_z = \frac{2\pi L}{\lambda} N_z \quad (2)$$

radians. The phase change resulting from the air gap between the two crystals 10 and 11 is the same for each component and will be expressed as a constant, $\alpha$. In passing through crystal 11 along the X-axis of the latter, the Y component of polarization undergoes a phase change of $$\phi_y = \frac{2\pi L}{\lambda} N_y \quad (3)$$

radians and the component parallel to the Z-axis undergoes a phase change the same as along the Z-axis of crystal 10, namely $$\phi_z = \frac{2\pi L}{\lambda} N_z \quad (4)$$

radians. The total phase change for the X- and Y-components in passing through both crystals is $$\theta_y = \phi_y + \phi_z + \alpha = \frac{2\pi L}{\lambda}(N_y + N_z) + \alpha \quad (5)$$

and $$\theta_y = \phi_x + \phi_z + \alpha = \frac{2\pi L}{\lambda}(N_x + N_z) + \alpha \quad (6)$$

respectively. The phase difference between the two components is $$\Delta\theta = \theta_y - \theta_x = \frac{2\pi L}{\lambda}[(N_y + N_z) - (N_x + N_z)] \quad (7)$$

This then becomes $$\Delta\theta = \frac{2\pi L}{\lambda}(N_y - N_x) \quad (8)$$

If no electric field is applied along the Z axes of the respective crystals, the indices of refraction $N_y$ and $N_x$ are equal, that is, $N_y = N_x = N_0$. The phase difference between the emerging perpendicular components of the linearly polarized input ray 12 indicated by the vector 16, is then zero, that is, $$\Delta\theta = 0 \quad (9)$$

The original polarization of the incident light ray is preserved and the emergent resultant vector 18 has the same polarization as that represented by the arrow 16 for the input light.

When an electric field is applied along the Z-axis of the two crystals, that is, when an electric potential is applied across the two horizontal sides of the crystal 10 in the direction indicated by the arrow 5 and a voltage of the same magnitude is simultaneously applied across the vertical sides of crystal 11 in the direction indicated by the arrow 6 the index of refraction $N_y$ of crystal 10 and the index refraction $N_x$ of the crystal 11 are no longer equal. However, the index of refraction $N_z$ along the axis of both crystals remains unchanged. The application of the electric field across the sides of the crystals as indicated causes one of the indices of refraction to increase while the other decreases. This may be represented as $$N_y = N_0 \pm \Delta N \quad (10)$$

and $$N_x = N_0 \mp \Delta N \quad (11)$$

where N is the change in index of refraction brought about by application of the electric field. It is well known in the art that $$\Delta N = \frac{r_{63} V_z N_0^3}{2d} \quad (12)$$

Substituting value of $N_y$ and $N_x$ in equation 8 gives $$\Delta\theta = \frac{2\pi L r_{63} V_z N_0^3}{2d} \quad (13)$$

where $r_{63}$ is an electro-optic constant and $V_z$ is the voltage applied along the Z-axis.

From Equation 13 it will be seen that the phase shift, $\theta$, is a direct function of the biasing voltage $V_z$ and the length of the crystals, L and an inverse function of the transverse dimension $d$. By properly choosing these parameters it is possible to cause the linearly polarized optical input to be rotated by 90°, that is, $$\Delta\theta = \pi \qquad (14)$$

In this latter condition the linearly polarized component 16 of the ray 12 will have its plane of polarization rotated 90° when it emerges from the right hand of crystal 11 as indicated by the dotted vector 18'.

The required voltage to cause a 90° rotation of the input polarization ray may be determined by substituting the values $$N_y = N_o + \Delta N$$

in Equations 10 and 11, respectively, and substituting the value of $\Delta\theta =$ in Equation 8. Solving this gives $$V_z = \frac{\lambda d}{2 r_{63} N_o^3 L} \qquad (15)$$

Since the factor $$\frac{\lambda}{2 r_{63} N_o^3}$$

is recognized as the half-wave voltage, that is, the voltage necessary to produce a 90° phase displacement between the emergent components of the incident ray when an electric field is applied parallel to the Z-axis and when the light is also parallel to the Z-axis. Therefore, a reduction in the halfway voltage by a factor of $L/d$ is accomplished by having the biasing voltage transverse to the propagation axis of the two crystals as schematically illustrated in FIGURE 1. This makes it possible to keep the operating voltage within a range which can readily be supplied by microwave energy and this in turn makes it possible in accordance with the present invention to provide a non-reciprocal light transmission system in which the traveling E vectors of the microwave energy supplies the bias voltage. The device will transmit light only in the direction in which the microwave field is traveling when both the light velocity and microwave field velocity are equal in the electro-optic medium and the electro-optic crystals are each a half wavelength long at the microwave frequency.

Figure 2:
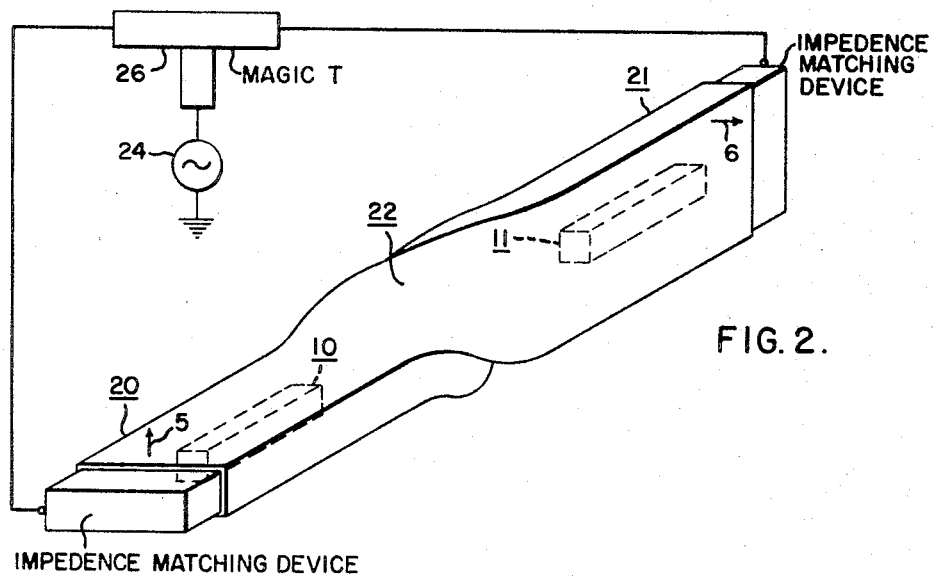
FIG. 2 is a diagrammatic illustration, of a non-reciprocal electro-optical device in accordance with the present invention.

To this end, in the embodiment of the invention illustrated in FIGURE 2 a traveling wave microwave structure is provided for supplying the E vectors 5 and 6 for the crystals 10 and 11, respectively. The microwave structure comprises two rectangular sections 20 and 21 adapted to propagate in the $TE_{10}$ mode with a 90° transition section 22. It will be apparent from FIGURE 2 that the electric vector which is supplied by a propagating microwave electric field will be perpendicular to the broad faces of the microwave guide. The crystal 10 is suitably supported in the microwave guide section 20 and the crystal 11 is suitably supported in the microwave guide section 21 so that the vector is 5 and 6 apply biasing voltages to the crystals in the directions indicated. It is understood of course that the transition section 22 has a "line of sight" opening in its center which is at least as large in cross section as the two crystals 10 and 11 which are in axial alignment so that optical energy may be transmitted through the microwave structure.

A suitable microwave impedance matching means may be provided at the opposite ends of the microwave structure through which microwave energy is transmitted to the microwave guide.

A suitable source of microwave energy, indicated at 24, may be coupled to either end of the microwave structure through a suitable microwave switch 26 in order to control the direction of propagation of microwave energy through the waveguide structure which in turn determines the direction in which the light energy can pass through the system.

The traveling wave microwave structure is designed to yield a microwave phase velocity in the electro-optic crystals which equals the velocity of the optical beam in the crystals. The crystals are chosen to be one-half wavelength long at the microwave frequency.

In the operation of this device, a net retardation of the optical wave will occur between the orthogonal components of the input plane polarized light for light propagating through the system in the same direction that the microwave field is being propagated, say from the left hand end of FIG. 2. This results from the fact that the microwave field and the optical field propagate at the same velocity in the electro-optic medium and the electric field vector E of the light beam will experience the same microwave electric field as the crystals 10 and 11. The amount of net retardation depends upon the strength of the microwave electric field and determines the degree of transmission through the device. The transmitted intensity is given mathematically $$I = I_o \sin^2 K E_m \qquad (16)$$

where $I_o$ is the intensity of the incident wave, K is the constant of electro-optic material and $E_m$ is the peak value of the microwave electric field. Therefore for a particular value of $E_m$ a theoretical 100% optical transmission can be achieved.

Figure 3:
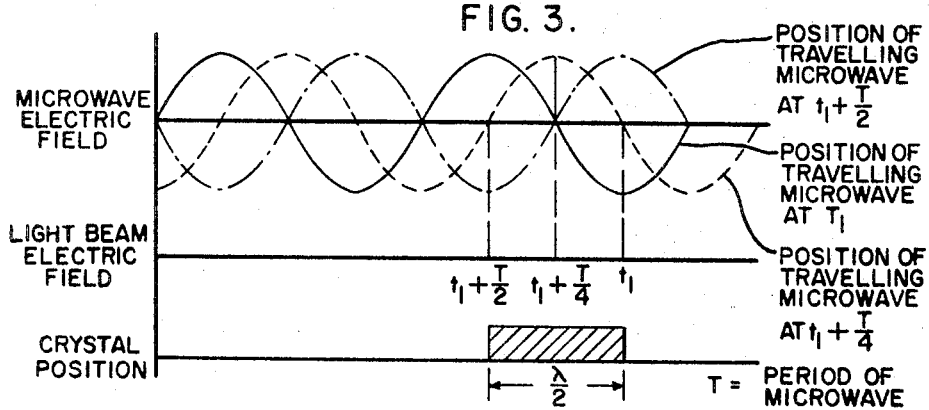
FIG. 3 is a graphical representation of the relative positions of the traveling microwave electric field vector, the light beam field vector and one of the crystals.

Now when the light beam is directed from the opposite end, say the right-hand end of the system, opposite to the direction of propagation of the microwave field the orthogonal components of the input light polarization will not experience a net retardation. This is illustrated in FIG. 3. Since no net retardation results when the light propagates in the direction opposite to the movement of the microwave field the original polarization of the light beam is preserved upon leaving the electro-optic crystals. Therefore, no optical transmission will occur in this direction because the output polarizer is crossed with the emerging polarization.

It will be apparent from the above description the present invention provides a novel non-reciprocal light transmission system relying upon the electro-optic effect and in which the electric field vector of a traveling microwave field supplies the necessary biasing voltage. Accordingly, the light must propagate in the same direction as the traveling microwave field and at the same velocity as the microwave field.

I claim as my invention:

1. Light transmission apparatus comprising a pair of elongated birefringent crystals having their physical axes in coaxial alignment and their optic axes transverse to their longitudinal axes, the optic axes of said crystals also being orthogonal to each other, microwave structure for propagating microwaves surrounding said crystals, said microwave structure including respective portions having their E vectors, respectively, perpendicular to each other and parallel, respectively, to the optic axes of the crystal which they surround.

2. Light transmission apparatus comprising a microwave structure having two spaced sections, means coupling said sections providing a 90° rotation of the plane of polarization, an elongated electro-optic crystal in each of said sections, said sections having their physical axes in axial alignment with their optic axes transverse to the physical axes and orthogonal to each other, the optic axes of each crystal being parallel with the E vector of the dominant mode of the section in which it is located.

3. Light transmission apparatus comprising two spaced sections of microwave guide, means coupling said sections providing a 90° rotation of the plane of polarization of the dominant mode in said sections, means for supplying microwave energy to one end of said structure for propagation through said structure in the dominant mode, and elongated electro-optic crystals in each of said sections, said crystals having their physical axes in coaxial alignment and with their optic axes transverse to the physical axes and orthogonal to each other, the optic axes of each crystal being parallel with the E vector of the dominant mode of the respective sections, said crystals having a physical length substantially equal to one-half wave length of the dominant microwave mode propagated in said wave guide structure.

4. Light transmission apparatus comprising two spaced rectangular microwave guide sections adapted to support the dominant $TE_{10}$ mode, means coupling said sections providing a 90° phase shift in the plane of polarization of the dominant mode, an elongated electro-optic crystal in each of said sections, said crystals having their physical axes in coaxial alignment and with their optic axes transverse to the physical axes and orthogonal to each other, means for supplying microwave energy to one end of said structure for propagation through said structure in a dominant mode, the optic axes of each crystal being parallel with the E vector of the dominant microwave mode, each of said crystals having a length substantially equal to one-half wavelength of the dominant microwave mode propagated in said waveguide structure.

5. The combination as set forth in claim 4 plus a light polarizing element at each end of said transmission apparatus with the planes of polarization of the respective elements being orthogonal to each other.

References Cited

Wentz: Novel Laser Q-Switching Mechanism, Proc. IRE (June 1964) pp. 716 and 717.

JEWELL H. PEDERSEN, *Primary Examiner.*

U.S. Cl. X.R.

333—24.3